UNITED STATES PATENT OFFICE.

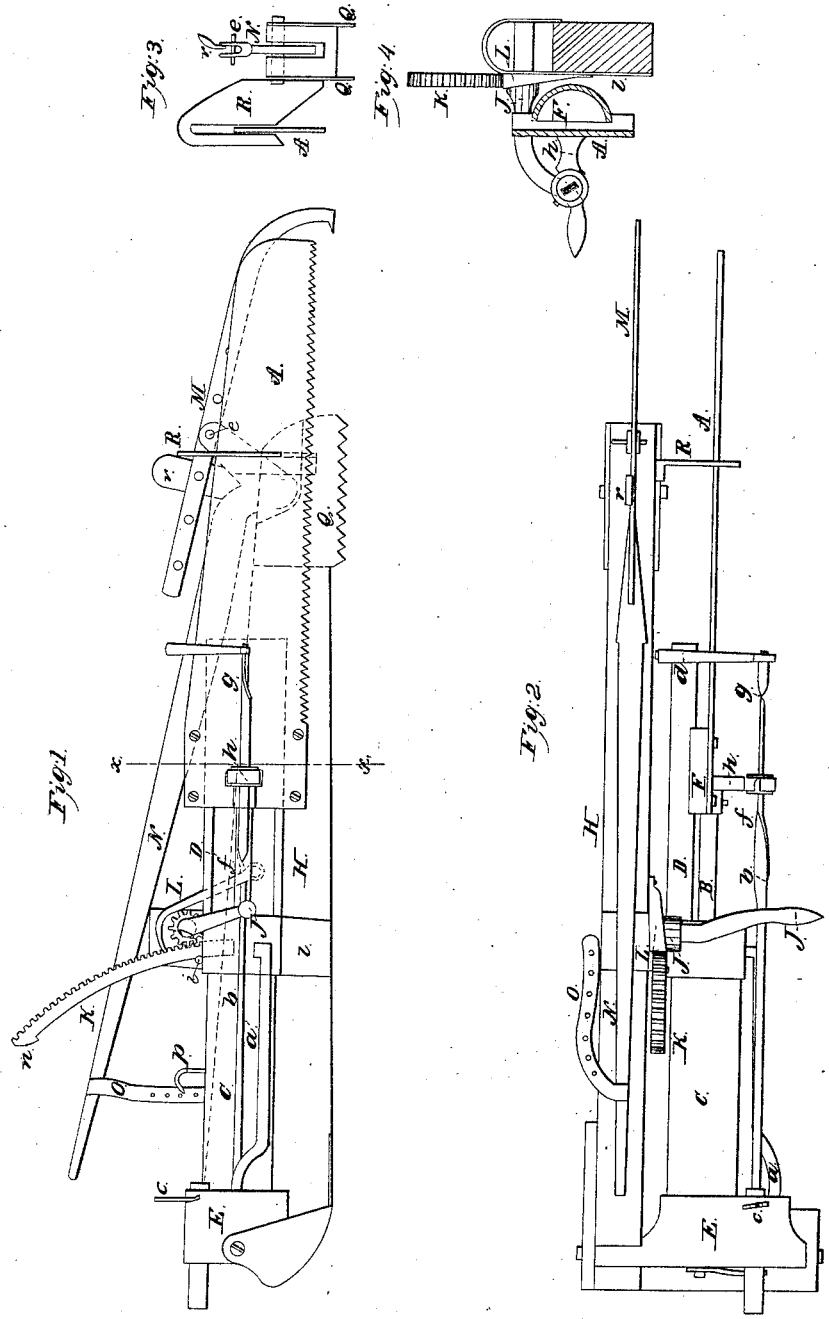

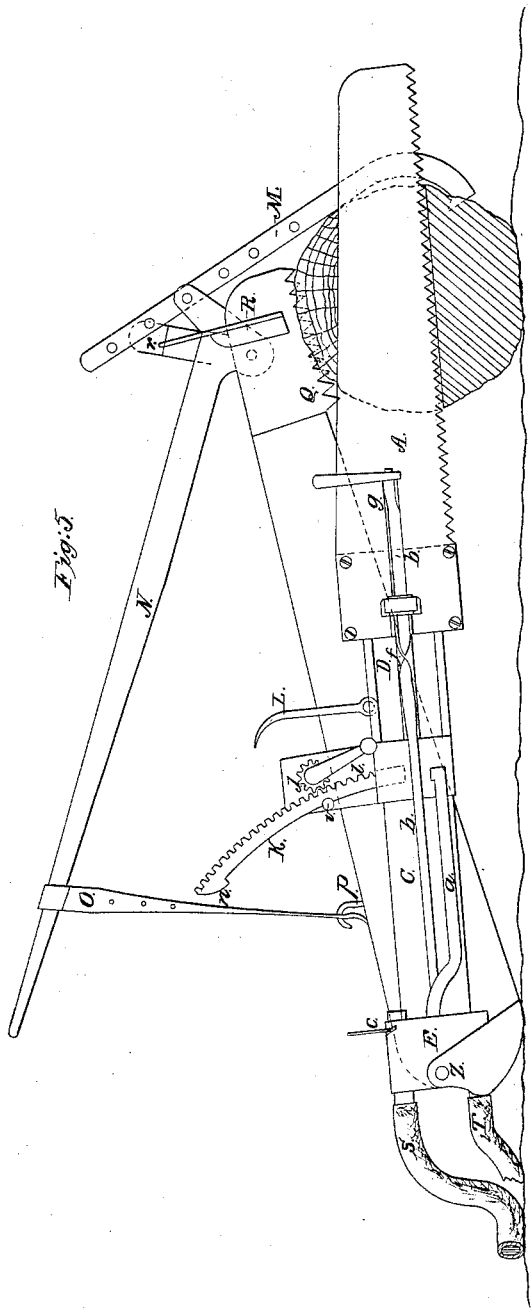

SAML. R. WILMOT, OF WATERTOWN, CONNECTICUT, AND R. G. FAIRBANKS, OF BROOKLYN, NEW YORK.

PORTABLE STEAM SAWING-MACHINE.

Specification of Letter Patent No. 17,601, dated June 16, 1857.

*To all whom it may concern:*

Be it known that we, SAMUEL R. WILMOT, late of the city, county, and State of New York, now of Watertown, in the county of Litchfield and State of Connecticut, and REUBEN G. FAIRBANKS, of Brooklyn, in the county of Kings and State of New York, have invented certain new and useful Improvements in Portable Steam Sawing Apparatus, of which the following is a full, clear, and exact description, reference being had to the accompanying drawing, in which—

Figure 1 represents a side elevation of our improved portable steam sawing apparatus with its parts in the proper position for carrying; Fig. 2 is a plan of the same; Fig. 3 is an end elevation of the same; Fig. 4 is a cross section of the same at the line $x\ x$ of Fig. 1; and Fig. 5 is a side view of the apparatus applied to a log.

The object of our improvements is to facilitate the attachment of a portable steam sawing apparatus to the object to be sawed and to render that attachment more secure. Also to enable the saw to be fed with greater regularity into the wood upon which it is acting, and to facilitate the movement of the apparatus from place to place.

In the Wilmot's portable steam sawing apparatus, the means for securing the engine and saw to the tree or log consists of a stock to which the engine is pivoted and which is situated at the back of the saw, and of a pair of dogs, which project from the stock upon both sides of the saw, and are driven into the log or tree to be sawed. This system of attaching the apparatus to the tree at both sides of the saw has proved objectionable in practice, as in cutting down a tree the dog which passes into the wood above the saw has to be detached before the tree falls; the same difficulty takes place in sawing off the unsupported extremity of a tree or log; in this case one of the dogs enters the unsupported end, and has to be detached therefrom before the end falls from the remainder; or the unsupported end has to be supported until the sawing is finished. Moreover, the use of dogs as a means of attachment is objectionable, as it necessitates the employment of a maul to drive them into the wood, and the blows produce jars which increase the wear and tear of the machine. In order to obviate these defects, we have constructed the stock with its attaching mechanism in such manner that it is applied to the wood upon one side only of the saw, thus leaving the wood at the opposite side of the saw free to move either by reason of its weight or by the application of force, while the apparatus is still secured to the remainder. We have also devised a species of adjustable lever clamp, by means of which the apparatus may be speedily and firmly clamped to objects of different size and form, and as readily detached therefrom when the sawing is completed. In the portable steam sawing apparatus, as originally constructed, the saw is fed into standing trees by prying between the engine and the stock to which it is secured by means of a handspike or crowbar. This system of feeding, although efficient and practicable, is defective, as the pressure can not be applied with sufficient regularity without the exercise of considerable care on the part of the attendant; moreover, there is no device in the original apparatus for locking the saw and engine to the stock in any desired position; hence the parts of the apparatus tend, by their weight, to change their relative positions during its movement from place to place, and it is a troublesome business to carry it about and to set it in its proper position in reference to the object upon which it is to act. We have remedied these defects by a feeding apparatus operated by a crank handle, and by combining with the feeding apparatus a pawl, by means of which the engine and saw may be retained or locked in any desired position with respect to the stock, so that the various parts may be rigidly secured to each other in convenient relative positions for carrying and for application to the object to be sawed. In the original apparatus the engine and the saw are connected with the stock solely by the pivots upon which they swing in entering into the wood; these pivots, therefore, are subjected to the whole strain resulting from the weight of the engine and saw when the machine is turned upon its side. A portion of the present invention consists in connecting the engine and saw with the stock at a point intermediate between the pivots and the extreme end of the stock by an attachment which will permit the free swinging of the engine and saw upon the pivots, but hinders them from sagging sidewise either toward or from the stock; thus relieving the pivots of the strain when the apparatus is turned upon its side, rendering the whole more firm and steady while in operation and permitting the use of a stock of diminished size and weight, by which the portability of the machine (which is its great element of success) is correspondingly increased. A guide has also been added to the machine to steady the saw and prevent its wabbling until it has entered sufficiently into the wood to be steadied by the saw kerf, and this guide is arranged in such manner that the saw leaves it as it enters the wood, so that after its duty is accomplished the guide offers no hindrance by friction to the movement of the saw.

The portable steam sawing apparatus represented in the accompanying drawing embodies our improvements. In it the saw A is impelled to and fro by means of a direct acting steam engine, whose piston rod B is connected directly with the saw. The end of the piston rod, which projects through a stuffing box in the head of the steam cylinder C, is fitted with a crosshead to which the saw is attached and with brasses that slide upon a guide D secured to the head of the steam cylinder. The butt of the steam cylinder is firmly secured in a block E which contains the throttle valve and the steam valve by which the steam is admitted to and discharged from the opposite extremities of the steam cylinder. It also contains the steam passages, one of which is prolonged by the addition of a tube $a$ to convey the steam to and from the farther extremity of the cylinder. The throttle valve is a simple puppet valve pressed lightly against its seat by a spring, and closed when necessary to shut off the steam from the boiler by means of a stem to which an endwise movement is imparted by causing its lever handle $c$ to move in an inclined slot. The steam valve is a four-way cock; its stem $b$ is prolonged and extended parallel with the piston rod, its extremity being pivoted in an arm $d$ that is secured to the outer end of the guide. The portion of this valve stem which is opposite the guide is flattened and is twisted at two points $f$ and $g$ to an extent equal to the angular movement of the valve in changing the flow of steam from one end of the steam cylinder to the other. The flattened part of the valve stem is traversed by a slide that is pivoted in an arm $h$ which projects from the crosshead F. This slide is fitted with two stops which alternately strike against the shoulders of the arm $h$, and limit the turning of the slide in opposite directions. The construction of this valve motion is such that the slide will turn upon the twisted portion of the valve stem in passing from either extremity of the stroke toward the center thereof, but will be stopped by the action of the stops and consequently will cause the twisted portions of the valve stem to turn in it, and actuate the valve, in passing from the middle of the stroke toward either extremity thereof.

The heel-block E, to which the engine and saw are pivoted, has a stock H secured to it that extends in a direction parallel with one side of the saw. The stock is connected with the engine near the head of the cylinder by the feeding and locking mechanism. This mechanism is composed mainly of a pinion, a segment, and a pawl; the pinion $j$ is secured to a shaft which turns in suitable bearings made fast to the stock; that end of it which is farther from the stock is bent to form a crank handle J by which the pinion can be readily turned. The segment K is secured at one end to the engine in such position that its teeth engage in those of the pinion; it slides against a plate $l$ secured to the side of the stock, and it is attached to the stock by a guide-brass $i$ in which its back slides so as to prevent it and the engine to which it is made fast from sagging away from the stock; it is also fitted with a stump or stop $n$ which prevents it from disengaging from the pinion by moving too far. The pawl L is pivoted to the stock, and laps over the pinion so that it may be engaged in the teeth of the segment to stop its movement, thus preventing the turning of the pinion and locking the engine and saw to the stock in any desired position.

The extremity of the stock which is farthest from the heel block, is fitted with the lever clamp by means of which the whole apparatus is made fast to the object to be sawed. For this purpose a bent lever N is pivoted to the end of the stock, and is fitted with a hook M which has a series of holes in its shanks so as to permit the pin $e$, which secures it to the short arm of the lever, to be shifted to accommodate the apparatus to objects of different size. The longer arm of the lever is fitted with a strap O, by which it may be drawn toward the stock and secured in any desired position by hooking one of the holes of the strap upon a hook $p$ secured to the stock.

In order to facilitate the carriage of the apparatus, a spring catch $r$ is attached to the lever to secure the hook in the position in which it is represented in Fig. 1. The hook operates in connection with a pair of toothed plates Q, secured to the stock, so that when the stock is applied to a tree or log, as shown at Fig. 5, the hook upon one side and the toothed plates upon the other side are indented into the wood, by drawing the longer arm of the lever toward the stock, so as to secure the whole apparatus rigidly in a proper position for the saw to act.

In order to steady the saw until it enters the wood, when the apparatus is set to cut a horizontal saw kerf, a guide R is secured to the extremity of the stock to embrace the saw upon both sides. As this guide is attached to the stock, the saw leaves it as it enters the wood; the guide thus prevents the wabbling of the saw until it enters the wood a sufficient distance to insure its steady movement, but does not impede the saw by friction against it after the saw has entered sufficiently to be steadied by the kerf produced.

The portable steam sawing apparatus thus described is connected by means of a flexible steam tight pipe S with a boiler of sufficient capacity to supply the requisite quantity of steam. In practice the boiler may be made of sufficient capacity to supply two such apparatus, each having its separate steam pipe which, if possible, should be sufficiently long to enable the sawing apparatus to be worked all day without shifting the boiler. The boiler which we have found best suited to the purpose is one with a fire grate long enough to burn cord wood, and with a single set of tubular return flues. Such a boiler may be conveniently mounted upon a pair of large wheels, and may be moved when necessary by horses or oxen. The boiler should be fitted with an apparatus for feeding it with water. The exhaust nozzle of the engine may also be fitted with a short piece of flexible pipe T to convey the exhaust steam to a convenient distance from the operator.

In attaching the sawing apparatus to a standing tree the hook M is lengthened or shortened by shifting its pin $e$, and the apparatus is clamped fast with its stock lowermost. Hence the apparatus is securely held by the stump when the tree falls, and is in no danger of being broken. In cross-cutting logs the apparatus is set upon the log with its stock fast to that portion thereof which is best supported; hence, when the log is sawed in two, the lightest or unsupported portion may drop without danger of injury to the sawing apparatus, which remains firmly secured to the heavier or stationary portion of the log. The lower clamps, it will be seen, afford an extremely ready means of attaching the apparatus to the object to be sawed and of disengaging it therefrom. It also dispenses with the use of a maul which it was necessary to use with the dogs theretofore employed for the purpose of attachment. When the machine is carried about the lever is drawn to the stock and made fast by hooking the last hole of the strap upon the hook on the stock; the hook is also made fast in line with the stock by the spring catch $r$ so that it does not trail upon the ground.

When the machine is cross cutting horizontal logs, the saw feeds by the weight of the saw and engine, but when cutting down trees it is necessary to feed it by hand; in such cases the feeding apparatus we have described comes into use, and it is only necessary to turn the crank handle J, to feed the saw into the wood with the requisite regularity and force. The segment of the feeding apparatus also forms part of the intermediate connection of the saw and engine with the stock, which greatly steadies the saw and engine, as its guide upon one side of the segment and the plate $l$, against which the other side of the segment slides, form in connection with the segment a movable attachment to the stock at a considerable distance from the pivots at the heel block; this arrangement also relieves the pivots at the heel block from the greater part of the strain when the saw is cutting horizontally, or when it is carried about. When the apparatus is moved about the pinion is turned to set the saw and engine parallel with the stock, and the whole is made fast by engageing the pawl L in the teeth of the segment. This locking of the saw and engine renders the apparatus perfectly rigid so that it can be handled and carried about like a single stick of wood.

Having thus described our improved portable steam sawing apparatus what we claim as our invention and desire to secure by Letters Patent is—

1. Attaching a portable steam sawing apparatus to the object to be sawed by attaching apparatus at the side of the saw only as herein set forth.

2. We also claim the combination of an adjustable lever clamping apparatus with the stock of a portable sawing apparatus, the several parts of the combination being constructed and combined substantially as herein set forth.

3. We also claim combining the stock of a steam sawing apparatus with the mechanism for actuating the saw by means of feeding mechanism constructed and operating substantially as herein set forth so as to feed the saw into the object to be sawed while the latter remains stationary.

4. We also claim locking the saw, and the mechanism swinging therewith, to the stock in the manner herein set forth so that the parts of the machine may be rigidly connected with each other so as to facilitate their removal from place to place.

5. We also claim connecting the swinging members of a portable steam sawing apparatus with the stock at a point intermediate between the pivots and the extremity of the stock as herein set forth.

In testimony whereof we have hereunto subscribed our names.

SAMUEL R. WILMOT.
REUBEN G. FAIRBANKS.

Witnesses:
H. S. LINCOLN,
JOHN J. BURCHELL.